Nov. 13, 1956     K. P. POTTER ET AL     2,770,420
MULTIPLE TEMPERATURE CONTROL DEVICE
Filed July 29, 1955
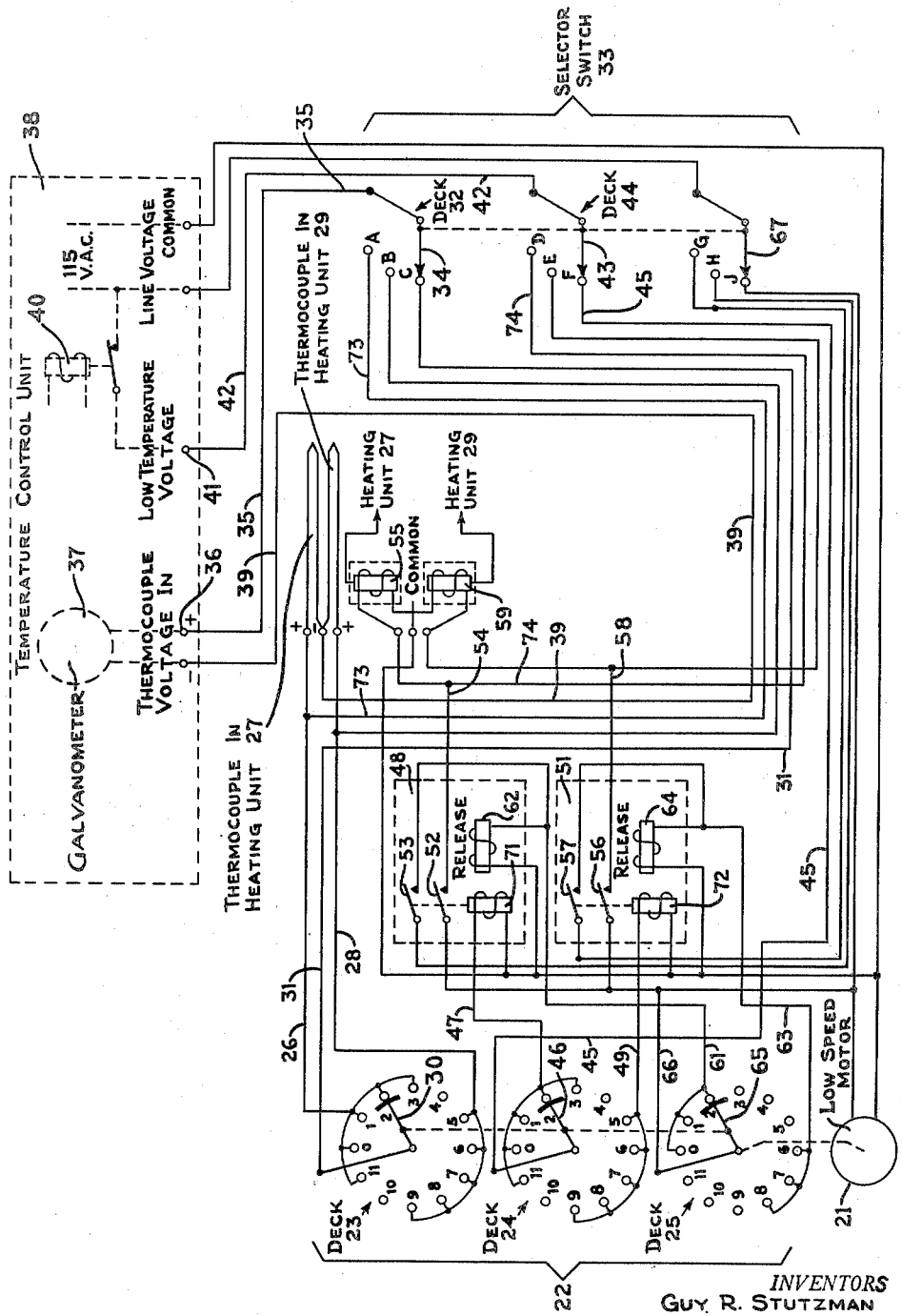
INVENTORS
GUY R. STUTZMAN
KENNETH P. POTTER
BY
*C. D. O'Brien*
*H. N. Losch*
ATTYS

United States Patent Office 2,770,420
Patented Nov. 13, 1956

2,770,420

MULTIPLE TEMPERATURE CONTROL DEVICE

Kenneth P. Potter, Indianapolis, and Guy R. Stutzman, Greenwood, Ind.

Application July 29, 1955, Serial No. 525,405

2 Claims. (Cl. 236—15)

(Granted under Title 35, U. S. Code (1952), sec. 266)

The invention described herein may be manufactured and used by or for the Government of the United States of America for governmental purposes without the payment of any royalties thereon or therefor.

The present invention relates to a temperature control device and more particularly to a control device that can regulate the temperature of a plurality of heating units.

It is often desirable to maintain constant temperature inside a furnace or oven over sustained periods of time. Heretofore it has been necessary to connect a temperature control unit to each furnace or oven that is to be regulated since different ovens, even of the same model, have different rates of heating and cooling. Also the furnaces or ovens would be opened at different times and one unit could reach the desired temperature and another unit might be under the desired temperature and the heating element on.

The present invention provides a simple cycling unit that can be attached to a standard control unit, and it is then possible to control a plurality of furnaces or ovens by using a single temperature control unit. In the present invention, a low speed motor is used to drive a rotary switch that connects various thermocouples in furnaces or ovens to a standard temperature control unit. The temperatures inside these furnaces or ovens are sampled and if heat is required, a unique system of relays is used to control the heating elemetns inside the furnace or oven requiring heat, independently of the other units.

It is therefore a general object of the present invention to provide an inexpensive cycling device that can be connected to a standard control unit and then used to regulate the temperature of a plurality of heating units.

Other objects and many of the attendant advantages of this invention will be readily appreciated as the same becomes better understood by reference to the following detailed description when considered in connection with the accompanying drawing wherein a preferred embodiment of the invention is shown.

Referring now to the drawing, there is shown a low speed motor 21 which drives a three deck shorting type rotary switch 22, which has decks 23, 24, and 25. Each deck of the rotary switch 22, as illustrated, has twelve positions, numbered 0–11 inclusive, however it being understood that a lesser or greater number of positions could work equally well.

For purposes of example, the invention is illustrated in the drawing for controlling two heating units and therefore deck 23 of the rotary switch 22 has terminals 11, 0, 1, 2, and 3 connected together, and also terminals 5–9, inclusive, are connected together. The first group of terminals are connected by lead 26 to the positive (+) pole of a thermocouple in heating unit 27 and the second group of terminals, namely 5–9 inclusive are connected by lead 28 to the positive (+) pole of a thermocouple in heating unit 29.

Contacting arm 30 is connected by lead 31 to position C of deck 32 of a selector switch 33 and a contacting arm 34 of selector switch 33 is connected by lead 35 to the positive (+) terminal 36 of a galvanometer 37 in a temperature control unit 38. Lead 39 connects the negative (−) terminals of the two termocouples to the galvanometer 37.

The temperature control unit 38 might be one of any commercial units, such as Model 72252 Chronotrol Capacitrol, which is a product of Wheelco Instrument Division, Rockford, Illinois. The function of the galvanometer 37, which is a part of the temperature control unit 38, is to compare the temperature (by comparing voltages) indicated by the particular thermocouple in circuit, with a preset value that the heating unit is to reach. If the measured temperature is lower than the preset temperature, solenoid 40 will be actuated and close a circuit and a voltage will be applied at terminal 41 and a current will flow through lead 42 to a contacting arm 43 of selector switch 33 and then to terminal F of deck 44. Lead 45 connects terminal F to contacting arm 46 of deck 24 in rotary switch 22. Deck 24 is similar to deck 23 in that terminals 11, 0, 1, 2, and 3 are connected together and also terminals 5–9, inclusive, are connected together.

The first group of terminals, namely, 11, 0, 1, 2, and 3 are connected by lead 47 to relay 48 and lead 49 connects the group of terminals 5–9, inclusive, to relay 51.

Relays 48 and 51 are of the latching type with electric releases and if a current is flowing in lead 47 relay 48 will be energized and the normally opened contacts 52 and 53 will be closed and a current will flow through lead 54 to solenoid 55 that switches on the heating element in heating unit 27. Likewise, whenever relay 51 is energized, contacts 56 and 57 will be closed and current will flow through lead wire 58 to solenoid 59 that switches on the heating element in heating unit 29.

Deck 25 of rotary switch 22 has terminals 0, 1, and 2 connected together and this group of terminals is connected by lead 61 to the release coil 62 in relay 48, and likewise terminals 6, 7, and 8 are connected together and are connected by lead 63 to the release coil 64 in relay 51. Contacting arm 65 in deck 25 is connected by lead 66 directly to the line voltage.

The low speed motor 21 drives the three contacting arms 30, 46, and 65 in synchronism, however, it should be observed that there is a shorter period of contact in deck 25, for each heating unit, as it is desired that release coils 62 and 64 be energized after the thermocouples are in circuit and likewise it is desirable for the release coils to be de-energized before the thermocouples are taken out of the circuit.

The operation of the control circuit can best be explained by describing the sequence of operation of a heating cycle for two heating units, as shown in the drawing, it being understood of course, that a greater number of furnaces or ovens could be controlled.

The first operation is to set the galvanometer 37 in the temperature control unit 38 for the desired temperature that is to be maintained in heating units 27 and 29. Selector switch 33 is then turned to automatic cycling positions with contacting arms 34, 43, and 67 being in contact with terminals C, F, and J, respectively. Contacting arm 67 connects the line voltage to the system and the low speed motor will drive the rotary switch 22.

Assuming that the contacting arms 30, 46, and 65 are in the position as shown in the drawing, when selector switch 33 is turned "on," it can be seen that the thermocouple in heating unit 27 will be put in circuit through lead 26, through contacting arm 30, through lead 31, through contacting arm 34 and then through lead 35 to terminal 36. The temperature of heating unit 27 is then compared by the galvanometer with the preset temperature and if the heating unit temperature is lower, a solenoid 40 will close a circuit and thus apply a voltage at terminal 41. This voltage can be traced through lead 42, contacting arm 43, lead 45, contacting arm 46, lead 47, and then to relay 48, which will then be energized, thus closing contacts 52 and 53 and a solenoid 55 will actuate to turn on the heat in heating unit 27.

It should be observed that a voltage is also being applied to release coil 62, however contacts 52, 53 are being held closed by solenoid 71. Then as the low speed motor 21 rotates switch 22, the voltage on release coil 62 will be removed when contacting arm 65 is disengaged from position 2 of deck 25. However, the voltage on solenoid 71 is still being applied as the voltage is not off until contacting arm 46 leaves position 3. Since relay 48 is the latching type with electrical release, it will remain closed until release coil 62 is again energized. When contacting arms 30 and 46 leave contacts 3 in their respective decks 23 and 24 the thermocouple in heating unit 27 will be out of circuit and there will not be a voltage on solenoid 71, yet relay 48 will be closed and heating unit 27 will be heating.

The same cycle takes place for heating unit 29 when contacting arms 30 and 46 reach position 5 in their respective decks 23 and 24. The thermocouple in heating unit 29 is placed in circuit and the temperature is compared with the preset temperature in galvanometer 37. If the temperature in heating unit 29 is lower than the preset temperature, a voltage will again be applied at terminal 41, which will energize solenoid 72 in relay 51, and contacts 56 and 57 will close, and solenoid 59 will actuate to turn on the heat in heating unit 29. When contacting arm 65 in deck 25, reaches position 6 the release coil 64 in relay 51 will be energized, but contacts 56 and 57 will remain closed because solenoid 72 is being energized. The voltage on the release coil 64 will be removed when contacting arm 65 leaves position 8, however there will be a voltage on solenoid 72 until contacting arm 46 in deck 24 leaves position 9. Thus contacts 56 and 57 will remain closed and heating unit 29 will be heating.

When contacting arms 30 and 46 reach position 11 the thermocouple in heating unit 27 will again be put in circuit and the temperature in heating unit 27 will be compared with the preset temperature. Now assuming that the oven temperature is equal to or greater than the preset temperature, there will not be a voltage at terminal 41 and consequently no voltage on solenoid 71. When contacting arm 65 in deck 25 reaches position 0, a voltage will be applied to release coil 62 which will open contacts 52 and 53 thus de-actuating solenoid 55 and shutting off the heat in heating unit 27.

The application of voltage to the release coils 62 and 64 sometime after the thermocouples are connected in circuit permits the galvanometer to stabilize and accommodate the delay in the circuit. When contacting arms 30 and 46 leave position 3 and the relay 48 is open, the heat to unit 27 will be off and will remain off, until it is again sampled at position 11. The same identical cycle takes place for heating unit 29, when contacting arms 30 and 46 reach position 5, for if the temperature of heating unit 29 is greater than the preset temperature, solenoid 72 will not be energized and when contacting arm 65 reaches position 6, a voltage will be applied to release coil 64, and contacts 56 and 57 will open, thus shutting off the heat to heating unit 29.

If the present temperature control device is used to control two heating units, a low speed motor turning about one R. P. M. provides adequate control in that each furnace is sampled approximately once each minute and enough time is provided for the galvanometer 37 to react to the thermocouple voltage. The present invention can be used to control a plurality of heating units by merely providing a latching relay for each heating unit and by dividing the control cycle equally among the heating units that are to be controlled.

Each deck of selector switch 33 has three positions, the automatic cycling position being shown engaged in the drawing, wherein contacting arms 34, 43, and 67 contact positions C, F, and J, respectively. When the three contacting arms 34, 43, and 67, which are coupled together, are switched to positions B, E, and H, or A, D, and G, the heating units can be operated singly. The rotary switch 22 and the low speed motor 21 are taken out of circuit, and also relays 48 and 51 are by-passed except that a voltage is applied to the release coils 62 and 64 so that the relays will be opened if they had been closed.

With the contacting arms 34, 43, and 67 in contact with positions A, D, and G, respectively, it can be seen that the thermocouple in heating unit 27 is connected to the galvanometer 37 through lead 73, contacting arm 34, and lead 35. Then if the temperature of the heating unit 27 is lower than the preset temperature of the temperature control unit a voltage will be applied at terminal 41 which will actuate solenoid 55 directly through lead 42, actuating arm 43 and lead 74. A similar circuit is employed to connect the thermocouple in heating unit 29 direct to the temperature control unit 38.

Obviously many modifications and variations of the present invention are possible in the light of the above teaching. For example, the motor driven rotary switch 22 could be replaced by individual on-off switches that could be actuated by cams. It is therefore to be understood that the invention may be practiced otherwise than as specifically described.

What is claimed is:

1. A temperature control device for regulating a plurality of heating units having heating elements comprising; a voltage supply; a plurality of thermocouples for indicating temperature, one each adapted for temperature indication in each of a plurality of heating units; a rotary switch having a plurality of decks, one deck for selectively connecting said thermocouples with a temperature control unit capable of comparing the temperature value indicated by said selected thermocouple with a preset temperature value and producing a voltage output whenever said indicating temperature is lower in value than said preset temperature; a plurality of relays; each having a set of contacts, a latching solenoid and a release coil; a second deck of said rotary switch for selectively connecting said latching solenoid in circuit with said temperature control unit whereby said voltage output energizes said latching solenoid and closes said contacts; a plurality of actuating means adaptable for controlling said heating elements, one each for each heating unit and operable by said voltage output, said actuating means being connected to said voltage output through said selected relay contacts; and a third deck of said rotary switch for selectively connecting said voltage supply in circuit with said release coils after said latching solenoid is connected in circuit with said temperature control unit.

2. A temperature control device as set forth in claim 1 wherein said rotary switch includes a contacting arm for each deck, said contacting arms being rotatably drivable by a low speed motor.

References Cited in the file of this patent

UNITED STATES PATENTS

| 890,718 | Smith | June 16, 1908 |
| 1,925,463 | Schmidt | Sept. 5, 1933 |

FOREIGN PATENTS

| 894,633 | Germany | Oct. 26, 1953 |